United States Patent [19]

Ramlow et al.

[11] Patent Number: 4,690,956

[45] Date of Patent: * Sep. 1, 1987

[54] PROCESS FOR THE PREPARATION OF GRAFT POLYMER DISPERSIONS AND FLAME-RETARDANT POLYURETHANE FOAMS

[75] Inventors: Gerhard G. Ramlow, Quebec, Canada; Duane A. Heyman, Monroe; Oscar M. Grace, Troy, both of Mich.

[73] Assignee: BASF Corporation, Parsippany, N.J.

[*] Notice: The portion of the term of this patent subsequent to Jun. 12, 2001 has been disclaimed.

[21] Appl. No.: 791,873

[22] Filed: Oct. 28, 1985

Related U.S. Application Data

[63] Continuation-in-part of Ser. No. 426,311, Sep. 29, 1982, Pat. No. 4,550,194, which is a continuation-in-part of Ser. No. 364,336, Apr. 1, 1982, Pat. No. 4,454,255.

[51] Int. Cl.$^4$ .................... C08K 5/06; C08K 5/10; C08L 29/02; C08L 51/08
[52] U.S. Cl. .................... 521/137; 525/41; 525/43; 525/450
[58] Field of Search .................... 521/137; 525/41, 43, 525/450

[56] References Cited

U.S. PATENT DOCUMENTS

| | | | |
|---|---|---|---|
| 3,823,201 | 7/1974 | Pizzini et al. | 524/762 |
| 3,850,861 | 11/1974 | Fabris et al. | 521/170 |
| 3,950,317 | 4/1976 | Patton, Jr. et al. | 526/78 |
| 3,953,393 | 4/1976 | Ramlow et al. | 526/218 |
| 4,140,667 | 2/1979 | Preston et al. | 524/762 |
| 4,161,468 | 7/1979 | Davis et al. | 524/751 |
| 4,202,956 | 5/1980 | Taylor | 528/75 |
| 4,242,249 | 12/1980 | Van Cleve et al. | 524/769 |
| 4,273,881 | 6/1981 | Otten | 521/108 |
| 4,280,979 | 7/1981 | Dunleavy et al. | 264/157 |
| 4,286,074 | 8/1981 | Davis et al. | 521/137 |
| 4,390,645 | 6/1983 | Hoffman et al. | 521/137 |
| 4,454,255 | 6/1984 | Ramlow et al. | 521/137 |
| 4,460,715 | 7/1984 | Hoffman et al. | 521/137 |

FOREIGN PATENT DOCUMENTS

0000503  2/1979  European Pat. Off.

*Primary Examiner*—John Kight
*Assistant Examiner*—M. L. Moore
*Attorney, Agent, or Firm*—Norbert M. Lisicki

[57] ABSTRACT

Graft polymer dispersions in polyoxyalkylene polyether polyols are employed together with flame retardant compounds to prepare flame retardant polyurethane foams. The polymer dispersions employ less than 0.1 mole of induced unsaturation per mole of polyol mixture. Processes for the preparation of these polymer dispersions employ fumarate derived polyetherester polyols or polyetherester polyols prepared by reacting a polyoxyalkylene polyether polyol with a compound selected from the group consisting of maleic acid, maleic anhydride and fumaric acid and an alkylene oxide in the presence of salts and oxides of divalent metals. The polymer dispersions are prepared in the presence of a reaction moderator and employ 50 weight percent or more of acrylonitrile.

20 Claims, No Drawings

PROCESS FOR THE PREPARATION OF GRAFT POLYMER DISPERSIONS AND FLAME-RETARDANT POLYURETHANE FOAMS

BACKGROUND OF THE INVENTION

This application is a continuation-in-part of Ser. No. 426,311, filed Sept. 29, 1982 now U.S. Pat. No. 4,550,194 which is a continuation-in-part of Ser. No. 364,336, filed Apr. 1, 1982, now U.S. Pat. No. 4,454,255.

FIELD OF THE INVENTION

The present invention relates to low viscosity graft polymer dispersions with high polymer content and flame retardant polyurethane foams prepared therefrom. More particularly, the invention relates to graft polymer dispersions prepared by the free radical polymerization of an ethylenically unsaturated monomer or mixture of monomers in the presence of a reaction moderator in a polyol mixture containing less than 0.1 mole of induced unsaturation per mole of polyol mixture. This improved process yields stable, non-settling dispersions with graft polymer contents of 25 percent by weight and higher employing monomer mixtures which contain 50 percent by weight or more acrylonitrile as the monomer. Further, the invention relates to an improved process employing free radical polymerization in a polyetherester polyol-polyoxyalkylene polyether polyol mixture containing less than 0.1 mole of induced unsaturation per mole of polyol mixture wherein the unsaturated moiety is a fumarate derived polyetherester polyol. Even more particularly the invention relates to an improved process employing free radical polymerization in a polyol mixture containing a polyetherester polyol-polyoxyalkylene polyether polyol mixture which was prepared by reacting (a) a polyoxyalkylene polyether polyol, (b) an unsaturated polycarboxylic acid anhydride and optionally (c) an alkylene oxide in the presence of an effective amount of a catalyst selected from the group consisting of salts and oxides of divalent metals.

DESCRIPTION OF THE PRIOR ART

The prior art, as evidenced by U.S. Pat. Nos. 3,652,658; 3,875,258; 3,950,317, and Reissue Pat. Nos. 28,715 and 29,014 teaches the preparation of graft polymer dispersions which are useful in the preparation of polyurethanes by the polymerization of ethylenically unsaturated monomers in polyols. The above patents disclose various methods of preparing graft polymer dispersions. U.S. Pat. No. 3,931,092 teaches the preparation of polymeric solids by carrying out the polymerization in the presence of a free-radical initiator, an organic solvent, and high unsaturation levels. The solvent concentration employed is from about 1 part to 19 parts by weight per part of the hydroxy-terminated organic compound which has a polymerizable carbon double bond. U.S. Pat. No. 3,953,393 teaches the preparation of graft copolymer dispersions by employing alkylmercaptan chain transfer agents at concentrations from 0.1 to 2 percent by weight based on the weight of vinyl monomer.

U.S. Pat. Nos. 4,390,645 and 4,460,715 teach the preparation of copolymer dispersions by the polymerization of ethylenically unsaturated monomers with adducts of an active hydrogen compound, e g. a polyether polyol with either an acrylyl compound or an ethylenically unsaturated isocyanate.

Stable dispersions of polymers in polyols have found broad commercial use in the preparation of polyurethanes. The use of these dispersions, known in the trade as graft or polymer polyols, improves processing and, among other properties, the firmness of the polyurethane products, often expressed as load bearing or modulus. There have been many attempts to improve the products representing the present state of the art. Efforts have been directed towards increasing the amount of polymer which is dispersed in the polyol, the obvious benefit being that firmer polyurethanes can be produced. Two major obstacles have been found: the viscosities of the resulting dispersions were too high, but even more undesirable, polyurethane foams made from these products could not be satisfactorily flame retarded to pass flammability tests which are standard in the industry without excessive use of flame retardants.

None of the prior art teaches that a low viscosity polymer dispersion of 25 to 70 weight percent based on the total weight of product in the presence of a reaction moderator and an unsaturated polyol containing less than 0.1 mole of induced unsaturation per mole of polyol mixture may be employed for flame-retardant polyurethane foams. Neither has the prior art taught that in situ free radical polymerizations may be conducted in a polyetherester polyol-polyoxyalkylene polyether polyol mixture containing less than 0.1 mole of induced unsaturation per mole of polyol mixture wherein the unsaturated moiety is a fumarate derived polyetherester polyol.

SUMMARY OF THE INVENTION

It has been discovered that flame-retardant polyurethane foams may be prepared by employing the graft polymer dispersions of the present invention. These dispersions are prepared by a process employing free radical polymerization of an ethylenically unsaturated monomer or monomers in the presence of a reaction moderator in a polyol mixture consisting of a polyetherpolyol and a macromer, as defined later, containing induced unsaturation of less than 0.1 mole per mole of polyol mixture. Furthermore, it has been found that improved dispersions may be prepared by employing free radical polymerization in a polyetherester polyol-polyoxyalkylene polyether polyol mixture containing less than 0.1 mole of induced unsaturation per mole of polyol mixture in the presence of a reaction moderator wherein the unsaturation moiety is a fumarate containing polyetherester polyol.

DESCRIPTION OF THE PREFERRED EMBODIMENTS

In accordance with the subject invention, low viscosity graft polymer dispersions which are employed in the preparation of flame retardant polyurethane foams are prepared by a process which comprises conducting the polymerization of an ethylenically unsaturated monomer or mixtures of monomers which contain 50 percent or more acrylonitrile in the presence of an effective amount of a free-radical initiator in the presence of a reaction moderator in an unsaturated polyol mixture containing less than 0.1 mole of induced unsaturation per mole of polyol mixture. In another embodiment of the invention the polymerization of an ethylenically unsaturated monomer or mixture of monomers which contain 50 percent or more acrylonitrile in the presence of an effective amount of a free radical initiator in an unsaturation containing polyol mixture containing less than 0.1 mole of unsaturation per mole of polyol mixture employs an improved process which comprises conducting the polymerization in a polyol mixture employing as part of the mixture a polyetherester polyol prepared by the reaction of a polyoxyalkylene polyether polyol with maleic anhydride and an alkylene oxide. This polyetherester polyol may be isomerized by methods well known by those skilled in the art. These include heat, or isomerization catalysts such as morpholine, dibutylamine, diethylamine, diethanolamine, thiols and salts and oxides of divalent metals. The polyols having induced unsaturation are hereinafter referred to as "macromers."

Chain transfer agents are preferentially employed as reaction moderators. Materials commonly known as chain transfer agents to those skilled in the art are preferentially employed as reaction moderators. Although the chain transfer agents do reduce the molecular weight of the vinyl polymer formed, certain chain transfer agents also perform a function in dispersion polymerization not previously recognized in the art. Combined with the other components of this invention these reaction moderators give lower viscosity, stable dispersions. In the absence of a reaction moderator the dispersions of this invention have a higher viscosity, may settle or coagulate, and the vinyl polymer fraction is not soluble in good solvents like N,N-dimethylformamide. The polymerization reaction may be carried out at temperatures between 25° C. and 180° C., preferably between 80° C. and 135° C. The polyol mixture contains less than 0.1 mole of unsaturation per mole of polyol mixture and ranges from 0.001 to 0.09 mole of unsaturation per mole of polyol, and preferably 0.002 to 0.02 mole of unsaturation per mole of polyol.

Among those reaction moderators which may be employed are as follows: acetaldehyde, N,N-dimethylacetamide, acrolein, bis(2-ethoxyethyl)acetal, triethyl aluminum, aniline, N,N-dimethylaniline, N,N-diethylaniline, anthracene, arabinose, 2-butanone, ethyl benzene, 1,4-butanediol, iodobenzene, vinyl benzoate, p-benzoquinone, tributyl borane, 1-buten-3-yne, 1-butanol, 2-butanol, dibutyl cadmium, carbon tetrabromide, chloroform, copper sulfate, crotonaldehyde, cumene, ethylene glycol, allyl alcohol, 2-vinyl-1,3-dioxolane, methyl-α-D-glycoside, glyceraldehyde, glycerol, 1,5-hexadien-3-yne, triethyl indium, ferric chloride, isobutyl alcohol, tetraethyl lead, diethyl mercury, methyl amine, morpholine, 2,6-dimethyl-2,6-octadiene, 4-methyl-1-pentanol, 1-methyl piperidine, tetraethylsilane, tetrabutyl tin, toluene, tributylamine, triethylamine, trimethylamine, tripropylamine, diethyl zinc, diphenylamine, 2-mercaptoethanol, 2-propanol, 1-propanol, 2-octanol, 2-ethyl-1-hexanol, bromotrichloromethane, 1-dodecanethiol, tertiary dodecyl mercaptan, 4,4'-Bis(α,α-dimethylbenzyl)diphenyl amine. The reaction moderators are not limited to those listed above.

The reaction moderators employed will depend on the particular mixtures of monomers employed and the molar ratios of such mixtures. The concentration of the chain reaction moderator is that amount which is effective in producing low viscosity stable dispersions and may range from 0.1 weight percent to 30 percent by weight based on the weight of monomer, preferably from 0.5 to 10.0 weight percent based on the weight of monomer.

Representative polyols essentially free from ethylenic unsaturation which may be employed in combination with the macromers of the invention are well known to those skilled in the art. They are often prepared by the catalytic condensation of an alkylene oxide or mixture of alkylene oxides either simultaneously or sequentially with an organic compound having at least two active hydrogen atoms, such as evidenced by U.S. Pat. Nos. 1,922,459; 3,190,927; and 3,346,557. Representative polyols include polyhydroxyl-containing polyesters, polyoxyalkylene polyether polyols, polyhydroxy-terminated polyurethane polymers, polyhydroxyl-containing phosphorus compounds, and alkylene oxide adducts of polyhydric polythioesters, polyacetals, aliphatic polyols and thiols, ammonia, and amines including aromatic, aliphatic, and heterocyclic amines, as well as mixtures thereof. Alkylene oxide adducts of compounds which contain 2 or more different groups within the above-defined classes may also be used, for example, amino alcohols which contain an amino group and a hydroxyl group. Also, alkylene oxide adducts of compounds which contain one SH group and one OH group as well as those which contain an amino group and an SH group may be used. Generally, the equivalent weight of the polyols will vary from 100 to 10,000, preferably from 1000 to 3000.

Any suitable hydroxy-terminated polyester may be used such as are prepared, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α, β-diethylsuccinic acid, isophthalic acid, terephthalic acid, hemimellitic acid, and 1,4-cyclohexanedicarboxylic acid. Any suitable polyhydric alcohol, including both aliphatic and aromatic, may be used such as ethylene glycol, propylene glycol, trimethylene glycol, 1,2-butanediol, 1,3-butanediol, 1,4-butanediol, 1,2-pentanediol, 1,4-pentane 1,5-pentanediol, 1,6-hexanediol, 1,7-heptanediol, glycerol, 1,1,1-trimethylolpropane, 1,1,1-trimethylolethane, 1,2,6-hexanetriol, α-methyl glucoside, pentaerythritol, and sorbitol. Also included within the term "polyhydric alcohol" are compounds derived from phenol such as 2,2-bis(4-hydroxyphenyl)-propane, commonly known as Bisphenol A.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Any suitable polyoxyalkylene polyether polyol may be used such as the polymerization product of an alkylene oxide or a mixture of alkylene oxides with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyoxyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyoxyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-oxybutylene and polyoxyethylene glycols, and random copolymer glycols prepared from blends of two or more alkylene oxides or by the sequential addition of two or more alkylene oxides. The polyoxyalkylene polyether polyols may be prepared by any known process such as, for example, the process disclosed by Wurtz in 1859 and *Encyclopedia of Chemical Technology*, vol. 7, pp. 257–262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2'-(4,4'-hydroxyphenyl)propane and blends thereof having equivalent weights of from 100 to 10,000.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing one or two —SH groups such as 2-mercaptoethanol, 1,2-ethanedithiol, 1,2-propanedithiol, 1,3-propanedithiol, and 1,6-hexanedithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-aminoaniline, 1,5-diaminonaphthalene, methylene dianiline, the condensation products of aniline and formaldehyde, and 2,3- 2,6-, 3,4-, 2,5-, and 2,4-diaminotoluene; aliphatic amines such as methylamine, triisopropanolamine, ethylenediamine, 1,3-diaminopropane, 1,3-diaminobutane, 1,4-diaminobutane, and ammonia.

Also, polyols containing ester groups can be employed in the subject invention. These polyols are prepared by the reaction of an alkylene oxide with an organic dicarboxylic acid anhydride and a compound containing reactive hydrogen atoms. A more comprehensive discussion of these polyols and their method of preparation can be found in U.S. Pat. Nos. 3,585,185; 3,639,541 and 3,639,542.

The unsaturated polyols or macromers which are employed in the present invention may be prepared by the reaction of any conventional polyol such as those described above with a compound selected from the group consisting of maleic acid, maleic anhydride and fumaric acid. Thereafter the unsaturated polyol may be reacted with an alkylene oxide, preferably ethylene or propylene oxide, to replace the carboxyl groups with hydroxyl groups prior to employment in the present invention. The amount of alkylene oxide employed is such as to reduce the acid number of the unsaturated polyol to about 5 or less.

The alkylene oxides which may be employed for the preparation of the polyetherester polyols include ethylene oxide, propylene oxide, butylene oxide, amylene oxide and mixtures of these oxides, preferably ethylene and propylene oxide.

The maleated macromers are isomerized at temperatures ranging from 80° C. to 120° C. for one-half hour to three hours in the presence of an effective amount of an isomerization catalyst. The catalyst is employed at concentrations greater than 0.01 weight percent based on the weight of the macromer and may be as high as 5.0 weight percent.

When preparing the polyetherester polyol employing the catalyst selected from the group consisting of salts and oxides of divalent metals, the concentration of catalyst which may be employed ranges from 0.01 to 0.5 weight percent based on the weight of polyol mixture. The temperatures employed range from 75° C. to 175° C. The equivalent weight of the polyol employed to prepare the macromer may vary from 1000 to 10,000, preferably from 2000 to 6000.

Among the divalent metals which may be employed are: zinc acetate, zinc chloride, zinc oxide, zinc neodecanoate, tin chloride, calcium naphthenate, calcium chloride, calcium oxide, calcium acetate, copper naphthenate, cadmium acetate, cadmium chloride, nickel chloride, manganese chloride, and manganese acetate.

Certain of the above-mentioned catalysts such as calcium naphthenate promote the complete isomerization of the maleate to the fumarate structure during the preparation of the macromer, while others such as zinc chloride, which is an effective catalyst for the esterification, inhibit this isomerization.

The macromer unsaturation ranges from 0.1 mole to 1.5 mole of unsaturation per mole of polyol and, preferably, from 0.5 to 1.0 mole of unsaturation per mole of polyol.

As mentioned above, the graft polymer dispersions of the invention are prepared by the in situ polymerization, in the above-described polyols of an ethylenically unsaturated monomer or a mixture of ethylenically unsaturated monomers. Representative ethylenically unsaturated monomers whioh may be employed in the present invention include butadiene, isoprene, 1,4-pentadiene, 1,6-hexadiene, norbornadiene, 1,7-octadiene, styrene, α-methylstyrene, 2-methylstyrene, 3-methylstyrene and 4-methylstyrene, 2,4-dimethylstyrene, ethylstyrene, isopropylstyrene, butylstyrene, phenylstyrene, cyclohexylstyrene, benzylstyrene, and the like; substituted styrenes such as cyanostyrene, nitrostyrene, N,N-dimethylaminostyrene, acetoxystyrene, methyl 4-vinylbenzoate, phenoxystyrene, p-vinylphenyl oxide, and the like; the acrylic and substituted acrylic monomers such as acrylonitrile, acrylic acid, methacrylic acid, methyl acrylate, 2-hydroxyethyl acrylate, methyl methacrylate, cyclohexyl methacrylate, benzyl methacrylate, isopropyl methacrylate, octyl methacrylate, methacrylonitrile, ethyl α-ethoxyacrylate, methyl α-acetaminoacrylate, butyl acrylate, 2-ethylhexyl acrylate, phenyl acrylate, phenyl methacrylate, N,N-dimethylacrylamide, N,N-dibenzylacrylamide, N-butylacrylamide, methacrylyl formamide, and the like; the vinyl esters, vinyl ethers, vinyl ketones, etc., such as vinyl acetate, vinyl butyrate, isopropenyl acetate, vinyl formate, vinyl acrylate, vinyl methacrylate, vinyl methoxyacetate, vinyl benzoate, vinyltoluene, vinylnaphthalene, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl methyl ketone, vinyl ethyl ketone, vinyl phosphonates such as vinyl phenyl ketone, n-vinyl carbazole, vinyl ethyl sulfone, N-methyl-N-vinyl acetamide, N-vinylpyrrolidone, vinyl imidazole, divinyl benzene, divinyl sulfoxide, divinyl sulfone, sodium vinylsulfonate, methyl vinylsulfonate, N-vinyl pyrrole, and the like; dimethyl fumarate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, vinyl pyridine, and the like. Any of the known polymerizable monomers can be used and the compounds listed above are illustrative and not restrictive of the monomers suitable for use in this invention. Preferably, the monomer is acrylonitrile.

The amount of ethylenically unsaturated monomer employed in the polymerization reaction is generally from 25 percent to 75 percent, preferably from 30 percent to 50 percent, based on the total weight of the dispersion. The polymerization occurs at a temperature between about 25° C. and 180° C., preferably from 80° C. to 135° C. It is preferred that at least 50 and up to 100 weight percent of the monomer employed is acrylonitrile.

Illustrative polymerization initiators which may be employed are the well-known free radical types of vinyl polymerization initiators such as the peroxides, persulfates, perborates, percarbonates, azo compounds, etc. These include hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, diacetyl peroxide, di-α-cumyl peroxide, dipropyl peroxide, diisopropyl peroxide, isopropyl-t-butyl peroxide, butyl-t-butyl peroxide, difuroyl peroxide, bis(triphenylmethyl) peroxide, bis(p-methoxybenzoyl) peroxide, p-monomethoxybenzoyl peroxide, rubene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-decalin hydroperoxide, α-methylbenzyl hydroperoxide, α-methyl-α-ethyl benzyl hydroperoxide, tetralin hydroperoxide, triphenylmethyl hydroperoxide, diphenylmethyl hydroperoxide, α,α'-azobis-(2-methyl heptonitrile), 1,1'-azo-bis(cyclohexane carbonitrile), 4,4'-azobis(4-cyanopentanoic acid), 2,2'-azobis(isobutyronitrile), 1-t-butylazo-1-cyanocyclohexane, persuccinic acid, diisopropyl peroxy dicarbonate, 2,2'-azobis(2,4-dimethylvaleronitrile), 2-t-butylazo-2-cyano-4-4-methylpentane, 2,2'-azobis-2-methylbutanenitrile, 2-t-butylazo-2-cyanobutane, 1-t-amylazo-1-cyanocyclohexane, 2,2'-azobis(2,4-dimethyl-4-methoxyvaleronitrile), 2-t-butylazo -2-cyano-4-methylpentane, 2-t-butylazo-2-isobutyronitrile, to butylperoxyisopropyl carbonate and the like; a mixture of initiators may also be used. The preferred initiators are 2,2'-azobis(2-methylbutanenitrile), 2,2'-azobis (isobutyronitrile), 2,2'-azobis(2,4-dimethylvaleronitrile), 2-t-butylazo-2-cyano-4-methoxy-4-methylpentane, 2-t-butylazo-2-cyano-4-methylpentane, and 2-t-butylazo-2-cyanobutane. Generally, from about 0.01 percent to about 5 percent, preferably from about 0.5 percent to about 1.5 percent, by weight of initiator based on the weight of the monomer will be employed in the process of the invention.

The graft polymer dispersions of this invention have useful viscosities less than 10,000 mPas at 25° C. Preferably they have viscosities ranging from 2000 to 8000 mPas at 25° C.

The polyurethane foams employed in the present invention are generally prepared by the reaction of a graft polymer dispersion with an organic polyisocyanate in the presence of a blowing agent and optionally in the presence of additional polyhydroxyl-containing components, chain-extending agents, catalysts, surface-active agents, stabilizers, dyes, fillers and pigments. Suitable processes for the preparation of cellular polyurethane plastics are disclosed in U.S. Reissue patent 24,514 together with suitable machinery to be used in conjunction therewith. When water is added as the blowing agent, corresponding quantities of excess isocyanate to react with the water and produce carbon dioxide may be used. It is possible to proceed with the preparation of the polyurethane plastics by a prepolymer technique wherein an excess of organic polyisocyanate is reacted in a first step with the polyol of the present invention to prepare a prepolymer having free isocyanate groups which is then reacted in a second step with water and/or additional polyol to prepare a foam. Alternatively, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride, and methylene chloride may be used as blowing agents.

The graft polymer dispersions may also be employed in the preparation of polyurethane elastomers.

Organic polyisocyanates which may be employed include aromatic, aliphatic, and cycloaliphatic polyisocyanates and combinations thereof. Representative of these types are the diisocyanates such as m-phenylene diisocyanate, 2,4-toluene diisocyanate, 2,6-toluene diisocyanate, mixtures of 2,4- and 2,6-toluene diisocyanate, hexamethylene diisocyanate, tetramethylene diisocyanate, cyclohexane-1,4-diisocyanate, hexahydrotoluene diisocyanate (and isomers), naphthalene-1,5-diisocyanate, 1-methoxyphenyl-2,4-diisocyanate, 4,4'-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate and 3,3'-dimethyldiphenylmethane-4,4'-diisocyanate; the triisocyanates such as 4,4',4"-triphenylmethane triisocyanate, and toluene 2,4,6-triisocyanate; and the tetraisocyanates such as 4,4'-dimethyldiphenylmethane-2,2'-5,5'-tetraisocyanate and polymeric polyisocyanates such as polymethylene polyphenylene polyisocyanate. Especially useful due to their availability and properties are toluene diisocyanate, 4,4'-diphenylmethane diisocyanate and polymethylene polyphenylene polyisocyanate.

Crude polyisocyanates may also be used in the compositions of the present invention, such as crude toluene diisocyanate obtained by the phosgenation of a mixture of toluene diamines or crude diphenylmethane isocyanate obtained by the phosgenation of crude diphenylmethane diamine. The preferred or crude isocyanates are disclosed in U.S. Pat. No. 3,215,652.

As mentioned above, the graft polyols may be employed along with another polyhydroxyl-containing component commonly employed in the art. Any of the polyhydroxyl-containing components which are described above for use in the preparation of the graft polyols may be employed in the preparation of the polyurethane foams useful in the present invention.

Chain-extending agents which may be employed in the preparation of the polyurethane foams include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water, ethylene glycol, 1,4-butanediol and primary and secondary diamines which react more readily with the prepolymer than does water such as phenylene diamine, 1,4-cyclohexane-bis-(methylamine), ethylenediamine, diethylenetriamine, N-(2-hydroxypropyl)ethylenediamine, N,N'-di(2-hydroxypropyl)ethylenediamine, piperazine, and 2-methylpiperazine.

Any suitable catalyst ma be used including tertiary amines such as, for example, triethylenediamine, N-methylmorpholine, N-ethylmorpholine, diethylethanolamine, N-cocomorpholine, 1-methyl-4-dimethylaminoethylpiperazine, 3-methoxypropyldimethylamine, N,N,N'-trimethylisopropyl propylenediamine, 3-diethylaminopropyldiethylamine, dimethylbenzylamine, and the like. Other suitable catalysts are, for example, stannous chloride, dibutyltin di-2-ethyl hexanoate, stannous oxide, as well as other organometallic compounds such as are disclosed in U.S. Pat. No. 2,846,408.

A surface-active agent is generally necessary for production of high grade polyurethane foam according to the present invention, since in the absence of same, the foams collapse or contain very large uneven cells. Numerous surface-active agents have been found satisfactory. Nonionic surface active agents are preferred. Of these, the nonionic surface-active agents such as the well-known silicones have been found particularly desirable. Other surface-active agents which are operative, although not preferred, include polyethylene glycol ethers of long chain alcohols, tertiary amine or alkanolamine salts of long chain alkyl acid sulfate esters, alkyl sulfonic esters, and alkyl arylsulfonic acids.

It has been found in the preparation of the flame retardant polyurethane foam products which have incorporated therein the graft polymer dispersions of the invention that less flame retardant compound is necessary to impart flame retardency. Among the flame retardants which may be employed are: pentabromodiphenyl oxide, dibromopropanol, tris(β-chloropropyl)phosphate, 2,2-bis(bromoethyl) 1,3-propanediol, tetrakis(2-chloroethyl)ethylene diphosphate, tris(2,3-dibromopropyl)phosphate, tris(8-chloroethyl)-phoshate, tris(1,2-dichloropropyl)phosphate, bis-(2-chloroethyl) 2-chloroethylphosphonate, molybdenum trioxide, ammonium molybdate, ammonium phosphate, pentabromodiphenyloxide, tricresyl phosphate, hexabromocyclododecane, melamine and dibromoethyl-dibromocyclohexane. The concentrations of flame retardant compounds which may be employed range from 1 to 25 parts per 100 parts of polyol mixture.

The following examples illustrate the nature of the invention. All parts are by weight unless otherwise stated. In the examples, the flame retarding properties of the polyurethane foam were determined by the California Bulletin No. 117 Test.

The following abbreviations are employed in the examples below:

Polyol A is a propylene oxide adduct of propylene glycol having a hydroxyl number of 145.

Polyol B is a trimethylolpropane, propylene oxide, ethylene oxide adduct containing 15 percent ethylene oxide having a hydroxyl number of 25.

Polyol C is a propylene oxide, ethylene oxide adduct of propylene glycol containing 25 percent ethylene oxide having a hydroxyl number of 145.

Polyol D is a glycerine, propylene oxide, ethylene oxide adduct containing 12.5 percent ethylene oxide having a hydroxyl number of 50.

Polyol E is a glycerine, propylene oxide, ethylene oxide adduct containing 10 percent ethylene oxide having a hydroxyl number of 25.

Polyol F is a glycerine, propylene glycol, propylene oxide, ethylene oxide adduct containing 14 percent ethylene oxide, reacted with allyl glycidyl ether to give an induced unsaturation of 0.3 mole per mole of polyol, containing 30 weight percent of 3:1 acrylonitrile: styrene based on the total weight of the reaction mixture and having a hydroxyl number of 25.

Polyol G is a trimethylolpropane, propylene oxide, ethylene oxide adduct containing 5 percent ethylene oxide having a hydroxyl number of 26.5.

Polyol H is a glycerine, propylene oxide, ethylene oxide adduct containing 18.5 percent ethylene oxide having a hydroxyl number of 35.0.

Macromer A is polyol B reacted with 0.8 equivalents of maleic anhydride per mole of Polyol B using Procedure A resulting in fumarate unsaturation of about 0.5 mole per mole of polyol.

Macromer B is Polyol G reacted with 0.8 equivalents of maleic anhydride per mole of Polyol G using Procedure A resulting in fumarate unsaturation of about 0.5 mole per mole of polyol.

Macromer C is Polyol E reacted with 0.8 equivalents of maleic anhydride per mole of Polyol E using Procedure D resulting in fumarate unsaturation of about 0.5 mole per mole of polyol.

Catalyst A—zinc neodecenoate as ppm zinc.

Catalyst B—calcium naphthenate as ppm calcium.

Catalyst C—copper naphthenate as ppm copper.

Catalyst D—cobalt naphthenate as ppm cobalt

Initiator A—2,2'-azobis(2-methylbutyronitrile)

Reaction Moderator A—1-dodecanethiol

Reaction Moderator B—morpholine

Reaction Moderator C—2-butanol

Reaction Moderator D—4,4'-bis(α,α-dimethyl benzyl)-diphenylamine.

Reaction Moderator E—1-butanol

Reaction Moderator F—2-mercaptoethanol

Monomer A—acrylonitrile

Monomer B—styrene

DEOA is diethanolamine.

TDI is toluene diisocyanate.

L-5309 is a silicone surfactant manufactured by Union Carbide Corporation.

DABCO 33Lv is a 33 percent solution of triethylene diamine in 67 percent dipropylene glycol.

NIAX A-1 is an amine catalyst manufactured by Union Carbide Corporation.

Niax A-4 is an amine catalyst manufactured by Union Carbide Corporation.

Procedure A

Charges:

The following charges were employed in Examples 1 through 17 except as noted otherwise in Table I.

2000 parts Polyol B
30.6 parts maleic anhydride (0.8 equivalents per mole of Polyol A)
10 parts catalyst B, 200 ppm calcium
96 parts ethylene oxide (0.01 percent maximum water)

A 3-liter round-bottom flask with a stirrer, thermometer and gas inlet was charged with polyol A, maleic anhydride and calcium naphthenate. The contents were heated to 125° C. and allowed to react for 1 hour. This intermediate was transferred to a 1-gallon steam heated stainless steel autoclave. After heating to 125° C. and pressurizing the reactor to 34 psig with nitrogen, ethylene oxide was added during 1 hour and the mixture was reacted for 8 hours. The product was isolated after discharging by stripping the volatiles at 105° C. for 1 hour at <10 mm Hg. This product is designated as macromer A.

Procedure B

Charges: To reactor:
Macromer: type and amount indicated
Polyol A as indicated
Stream #1:
  acrylonitrile—as indicated
  styrene - as indicated
Stream #2:
  Polyol A as indicated
  Initiator A: 2,2'-azobis(2-methylbutyronitrile)
  Reaction Moderator: as indicated Reaction Conditions: reaction temperature, 105° C. for Example 18 and 125° C. for Examples 19-25 and 29; monomer addition time, 240 minutes; polyol initiator addition time, 250 minutes; reaction time, 30 minutes; 300 rpm stirring. The reactor charges were added to a 1-liter 4-neck flask fitted with a stirrer, nitrogen inlet, addition tube, thermowell, and take-off flask. After heating the polyol reaction mixture to 125° C. under nitrogen, streams #1 and #2 were added through a Kenics static mixer over the specified time period. Upon completion of addition the mixture was reacted for 30 minutes. After the reaction period was completed the reaction mixture was vacuum stripped for 30 minutes at 125° C. and 1 mm Hg.

Procedure C

Charges: To Reactor:
Macromer: Type and amount indicated
Polyol D as indicated
Stream #1
  Acrylonitrile—as indicated
  Styrene: as indicated
  Reaction Moderator: as indicated
Stream #2
  Polyol D as indicated
  Initiator A: 2,2'-azobis(2-methylbutyronitrile) as indicated Reaction Conditions: reaction temperature, 125° C.; monomer addition time, 210 minutes; polyol initiator addition time, 220 minutes; reaction time, 30 minutes; 300 rpm stirring. The reactor charges were added to a 1-liter 4-neck flask fitted with a stirrer, nitrogen inlet, addition tube, thermowell and take-off flask. After heating the polyol reaction mixture to 125° C. under nitrogen, streams #1 and #2 were added through a Kenics static mixer over the specified time period. Upon completion of addition the mixture was reacted for 30 minutes. After the reaction period was completed the reaction mixture was vacuum stripped for 30 minutes at 125° C. and 1 mm Hg.

Procedure D

A 3-liter round bottom flask equipped with a stirrer, thermometer and gas inlet was charged with 2000 parts of Polyol G, the amount of maleic anhydride indicated and the type and amount of catalyst as shown. The content were heated to 125° C. and allowed to react for about one hour in a nitrogen atmosphere. This intermediate was transferred to a one-gallon steam heated autoclave and allowed to react with 96 parts of propylene oxide over a period of about 8 hours. The product was then stripped of volatiles at 105° C. for one hour at <10 mm Hg. This product is designated Macromer C.

EXAMPLES 1-17

The products of these examples were prepared employing the various catalysts, at various concentrations and at variable maleic anhydride contents using procedure A for Examples 1-13 and Procedure D for Examples 14-17. The products of all the examples were produced in yields greater than 95 percent based on the quantity of volatiles removed.

TABLE I

| Examples | Maleic Anhydride Equivalents* | Catalyst | Catalyst Level, ppm | OH No. | Acid No. | Saponification No. | Unsaturation mole/mole** | Viscosity cps, 25° C. |
|---|---|---|---|---|---|---|---|---|
| 1 | 0.8 | A | 800 | 25.5 | 0.57 | 22.2 | 0.6 M | 11,900 |
| 2 | 0.8 | B | 800 | 25.2 | 0 | 13.8 | 0.4 F | 12,200 |
| 3 | 0.8 | C | 800 | 22.2 | 1.3 | 18.6 | 0.6 M | 2,760 |
| 4 | 0.8 | D | 800 | 22.5 | 0.05 | 15.6 | 0.35 F/0.1M | 15,250 |
| 5 | 0.8 | B | 800 | 26.3 | 0.22 | 15.1 | 0.45 F | 9,425 |
| 6 | 1.0 | B | 800 | 21.6 | 0 | 19.2 | 0.40 F/0.1M | 17,290 |
| 7 | 1.5 | B | 800 | 23.9 | 0 | 27.1 | — | 100,000 |
| 8 | 0.8 | B | 400 | 24.0 | 0 | 11.3 | 0.37 F | 8,485 |
| 9 | 0.8 | B | 200 | 21.6 | 0 | 11.6 | 0.48 F | 7,370 |
| 10 | 0.8 | B | 100 | 20.7 | 0 | 16.3 | 0.55 F | 11,390 |
| 11 | 0.8 | B | 200 | 22.3 | 0 | 16.7 | 0.48 F | 8,030 |
| 12 | 0.8 | B | 200 | 17.9 | 0.8 | 16.6 | 0.35 F | 16,830 |
| 13 | 0.8 | B | 200 | 21.7 | 0 | 19.3 | 0.55 F | 10,230 |
| 14 | 0.8 | B | 200 | 23.3 | 0.1 | 20.3 | 0.50 F | — |
| 15 | 0.8 | B | 200 | 21.3 | 0.1 | 19.0 | 0.50 F | 7,410 |

TABLE I-continued

| Examples | Maleic Anhydride Equivalents* | Catalyst | Catalyst Level, ppm | OH No. | Acid No. | Saponification No. | Unsaturation mole/mole** | Viscosity cps, 25° C. |
|---|---|---|---|---|---|---|---|---|
| 16 | 0.8 | B | 800 | 25.6 | 0.1 | 24.4 | 0.50 F | 6,750 |
| 17 | 0.8 | B | 200 | 21.5 | 0.3 | 16.5 | 0.45 F | — |

*equivalents of maleic anhydride per mole of polyol.
**moles of induced unsaturation per mole of polyol where M is the amount of maleate unsaturation and F is the amount of furmarate unsaturation.
Examples 14–17 were prepared employing Polyol G using Procedure D.
Example 12 was prepared using only 3 moles of ethylene oxide.

EXAMPLES 18–29

Examples 18–25 and 29 were prepared employing Procedure B. Examples 26–28 were prepared employing Procedure C.

TABLE II

| Example | Macromer, p | Polyol Charge | Polyol Feed | Reaction Moderator, p | Monomers, p | Viscosity mPas, 25° C. |
|---|---|---|---|---|---|---|
| 18 | B, 10.5 | 139.5 | 150 | A, 4.5 | A200 + B100 | 3500 |
| 19 | B, 15.0 | 135 | 150 | B, 3.0 | A200 + B100 | 3390 |
| 20 | B, 12.0 | 138 | 150 | C, 30.0 | A200 + B100 | 3120 |
| 21 | B, 15.0 | 135 | 150 | D, 4.5 | A200 + B100 | 3000 |
| 22 | B, 12.0 | 138 | 150 | B, 4.5 | A225 + B75 | 2940 |
| 23 | B, 12.0 | 138 | 150 | B, 6.0 | A240 + B60 | 2780 |
| 24 | C, 12.0 | 138* | 150* | B, 3.0 | A200 + B100 | 3710 |
| 25 | A, 12.0 | 138* | 150* | F, 3.0 | A200 + B100 | 3240 |
| 26 | B, 9.0 | 171 | 180 | C, 50.0 | A160 + B80 | 4170 |
| 27 | B, 9.0 | 171 | 180 | B, 7.2 | A160 + B80 | 3890 |
| 28 | B, 9.0 | 171 | 180 | E, 60.0 | A160 + B80 | 5090 |
| 29 | B, 19.5 | 130.5 | 150 | A, 4.5 | A200 + B100 | 4600 |

*The polyol employed was Polyol C.

EXAMPLES 30–33

The polyurethane foams of Table III was prepared by charging a one quart cylindrical container with a suitable quantity of the polyol, water, catalysts, silicone surfactant and flame retardant compounds. The mixture was stirred for about 30 seconds, allowed to set for about 15 seconds and then stirring was resumed. After about 60 seconds elapsed time, the polyisocyanate was added to the container, and the resulting mixture was stirred for about 4 to 5 seconds. The content of the container was then immediately poured into an aluminum mold, and the foam was allowed to rise therein. After the foam rise was completed, the resulting foam was oven cured for about 15 minutes.

Table III sets forth the ingredients and amounts thereof used to prepare the foams as well as the flame retardancy of the foams.

The flame retardancy tests, as exemplified by the California No. 117 open flame test, indicate that flame retardancy may be obtained with reasonably low levels of flame retardant compounds employing the polymer dispersions of the instant invention.

TABLE III

| Example | Spec., Max. | 30 | 31 | 32 | 33 |
|---|---|---|---|---|---|
| Formulation | | | | | |
| Polyol H | | 50 | 70 | 80 | 80 |
| Polyol F | | 50 | — | — | — |
| Polyol of Example 29 | | — | 30 | 20 | 20 |
| Melamine | | 5 | 5 | 100 | 5 |
| H₂O | | 2.0 | 2.0 | 2.0 | 2.0 |
| DABCO 33LV | | 0.27 | 0.27 | 0.27 | 0.27 |
| NIAX A-4 | | 0.2 | 0.2 | 0.2 | 0.2 |
| NIAX A-1 | | 0.1 | 0.1 | 0.1 | 0.1 |
| DEOA | | 1.0 | 1.0 | 1.0 | 1.0 |
| L-5309 | | 1.45 | 1.45 | 1.45 | 1.45 |
| TDI | | 26.7 | 29.4 | 28.7 | 28.7 |
| California No. 117 Section A, Part I, Open Flame Test | | | | | |
| After Flame, sec. | | | | | |
| Average | 5.0 | 30.2 | 3.9 | 0.66 | 0.72 |
| Maximum | 10.0 | 63.2 | 7.1 | 1.8 | 1.6 |
| Char Length, in. | | | | | |
| Average | 6.0 | 6.7 | 2.0 | 0.82 | 1.6 |
| Maximum | 8.0 | 12.0 | 3.0 | 1.0 | 1.9 |

The embodiments of the invention in which an exclusive privilege or property is claimed are defined as follows:

1. A stable low viscosity graft polymer dispersion formed by polymerizing in the presence of a reaction moderator and a free radical initiator (a) an ethylenically unsaturated monomer or mixture of monomers provided that in the mixture of monomers the concentration of acrylonitrile or methacrylonitrile is 50 weight percent to 100 weight percent of the weight of monomers, in (b) from about 25 to about 75 weight percent based on the total weight of the dispersion, a polyol mixture comprising (1) a polyoxyalkylene polyether polyol having an equivalent weight from 100 to 10,000, (2) a macromer containing induced fumarate unsaturation consisting essentially of a polyoxyalkylene polyether polyol having an equivalent weight from 100 to 10,000 , wherein the polyol mixture contains from 0.001 to 0.09 mole of induced unsaturation per mole of polyol mixture.

2. The polymer dispersion of claim 1 wherein the monomer is selected from the group consisting of at least 50 weight percent acrylonitrile and the remainder selected from 4-methylstyrene, vinyl toluene, methyl methacrylate, methacrylonitrile, and styrene.

3. The polymer dispersion of claim 1 wherein the reaction moderator is selected from the group consisting of 1-dodecanethiol, morpholine, 2-butanol, 1- butanol, 2-mercaptoethanol and 4,4'-bis($\alpha,\alpha$-dimethylbenzyl) diphenylamine.

4. The polymer dispersion of claim 1 wherein the concentration of reaction moderator is from about 0.1 weight percent to about 30 weight percent based on the weight of the monomer.

5. The polymer dispersion of claim 1 wherein the concentration of said reaction moderator is from about 0.5 weight percent to about 10.0 weight percent based on the weight of the monomer.

6. A process for the preparation of a stable low viscosity graft polymer dispersion comprising polymerizing in the presence of a reaction moderator and in the presence of a free radical initiator (a) an ethylenically unsaturated monomer or mixture of monomers provided that in the mixture of monomers the concentration of acrylonitrile or methacrylonitrile is 50 weight percent to 100 weight percent of the weight of monomers, in (b) from about 25 to about 75 weight percent based on the total weight of the dispersion, a polyol mixture comprising (1) a polyoxyalkylene polyether polyol having an equivalent weight from 100 to 10,000, (2) a macromer containing induced fumarate unsaturation consisting essentially of a polyoxyalkylene polyether polyol having an equivalent weight from 100 to 10,000, wherein the polyol mixture contains from 0.001 to 0.09 mole of induced unsaturation per mole of polyol mixture.

7. The process of claim 5 wherein the monomer is selected from the group consisting of at least 50 weight percent acrylonitrile, and the remainder selected from methylstyrene, vinyl toluene, methyl methacrylate, methacrylonitrile, divinylbenzene and styrene.

8. The process of claim 5 wherein the polymerization occurs in the presence of a reaction moderator selected from the group consisting of 1-dodecanethiol, morpholine, 2-butanol, 1-butanol, 2-mercaptoethanol and 4,4'-bis($\alpha,\alpha$-dimethylbenzyl)diphenylamine.

9. The process of claim 6 wherein the concentration of reaction moderator is from about 0.1 weight percent to about 30 weight percent based on the weight of the monomer.

10. The process of claim 6 wherein the concentration of said reaction moderator is from about 0.5 weight percent to about 10.0 weight percent based on the weight of the monomer.

11. A flame retardant polyurethane foam prepared by reacting the (a) polymer dispersion of claim 1, (b) an organic polyisocyanate, (c) a blowing agent, (d) a urethane forming catalyst, (e) foam stabilizers, and (f) flame retardants.

12. A flame retardant polyurethane foam prepared by reacting the (a) polymer dispersion of claim 2.

13. A flame retardant polyurethane foam prepared by reacting the (a) polymer dispersion of claim 3.

14. A flame retardant polyurethane foam prepared by reacting the (a) polymer dispersion of claim 4.

15. A flame retardant polyurethane foam prepared by reacting the (a) polymer dispersion of claim 5.

16. A flame retardant polyurethane elastomer prepared by reacting the (a) polymer dispersion of claim 1, (b) an organic polyisocyanate, (c) a urethane forming catalyst, (d) foam stabilizers, and (e) flame retardants.

17. A flame retardant polyurethane elastomer prepared by reacting the (a) polymer dispersion of claim 2.

18. A flame retardant polyurethane elastomer prepared by reacting the (a) polymer dispersion of claim 3.

19. A flame retardant polyurethane elastomer prepared by reacting the (a) polymer dispersion of claim 4.

20. A flame retardant polyurethane elastomer prepared by reacting the (a) polymer dispersion of claim 5.

* * * * *